United States Patent
Tani

(10) Patent No.: US 6,915,283 B2
(45) Date of Patent: Jul. 5, 2005

(54) INFORMATION PROCESSING APPARATUS AND METHOD, AND RECORDING MEDIUM

(75) Inventor: Jun Tani, Tokyo (JP)

(73) Assignee: Sony Corporation, Tokyo (JP)

(*) Notice: Subject to any disclaimer, the term of this patent is extended or adjusted under 35 U.S.C. 154(b) by 605 days.

(21) Appl. No.: 09/897,564

(22) Filed: Jul. 2, 2001

(65) Prior Publication Data

US 2002/0018127 A1 Feb. 14, 2002

(30) Foreign Application Priority Data

Jul. 4, 2000 (JP) ........................................ 2000-202604

(51) Int. Cl.[7] ............................................. G06F 15/18
(52) U.S. Cl. ....................................................... 706/30
(58) Field of Search ........................................... 706/30

(56) References Cited

U.S. PATENT DOCUMENTS

| | | | | | |
|---|---|---|---|---|---|
| 5,129,039 | A | * | 7/1992 | Hiraiwa | 706/25 |
| 5,175,678 | A | * | 12/1992 | Frerichs et al. | 700/47 |
| 5,640,494 | A | * | 6/1997 | Jabri et al. | 706/25 |
| 5,649,065 | A | * | 7/1997 | Lo et al. | 706/22 |
| 5,659,666 | A | * | 8/1997 | Thaler | 706/16 |
| 5,671,336 | A | * | 9/1997 | Yoshida et al. | 706/30 |
| 5,761,386 | A | * | 6/1998 | Lawrence et al. | 706/20 |
| 5,787,425 | A | * | 7/1998 | Bigus | 707/6 |
| 6,018,727 | A | * | 1/2000 | Thaler | 706/16 |
| 6,601,051 | B1 | * | 7/2003 | Lo et al. | 706/23 |
| 6,735,580 | B1 | * | 5/2004 | Li et al. | 706/21 |
| 6,751,601 | B2 | * | 6/2004 | Zegers | 706/16 |
| 6,792,413 | B2 | * | 9/2004 | Tani | 706/30 |

OTHER PUBLICATIONS

Magnetic force control based on the inverse magnetostrictive effect Ueno, T.; Jinhao Qiu; Tani, J.; Magnetics, IEEE Transactions on, vol.: 40, Issue: 3, May 2004 pp.: 1601–1605.*

Magnetic force control with composite of giant magnetostrictive and piezoelectric materials Ueno, T.; Qiu, J.; Tani, J.; ☐☐Magnetics, IEEE Transactions on, vol.: 39, Issue: 6, Nov. 2003 pp.: 3534–3540.*

Self–organization of behavioral primitives as multiple attractor dynamics: A robot experiment Tani, J.; Ito, M.; Systems, Man and Cybernetics, Part A, IEEE Transactions on, vol.: 33, Issue: 4, Jul. 2003 pp.: 481–488.*

Phase transitions in intermetallic compounds Ni–Mn–Ga with shape memory effect Dikshtein, I.; Koledov, V.; Shavrov, V.; Tulaikova, A.; Cherechukin, A.; Buchelnikov, V.; Khovailo, V.; Matsumoto, M.; Takagi, T.; Tani, J.;Magnetics, IEEE Transactions☐☐1999.*

Identification of crack depths from eddy current testing signal Fukutomi, H.; Huang, H.; Takagi, T.; Tani, J.; Magnetics, IEEE Transactions on, vol.: 34, Issue: 5, Sep. 1998 pp.: 2893–2896.*

(Continued)

*Primary Examiner*—Anthony Knight
*Assistant Examiner*—Michael B. Holmes
(74) *Attorney, Agent, or Firm*—Frommer Lawrence & Haug LLP; William S. Frommer

(57) ABSTRACT

An information processing apparatus includes a first recurrent neural network (RNN) for performing processing which corresponds to a time-series and a second RNN for processing another correlated time-series. The difference between a context set output by the first RNN and a context set output by the second RNN is computed by a subtractor, and the obtained difference is used as a prediction error. Backpropagation is performed based on the prediction error, thus determining a coefficient for each neuron of an output layer, an intermediate layer, and an input layer.

7 Claims, 14 Drawing Sheets

OTHER PUBLICATIONS

Numerical evaluation of ECT impedance signal due to minute cracks Fukutomi, H.; Takagi, T.; Tani, J.; Hashimoto, M.; Shimone, J.; Harada, Y.; Magnetics, IEEE Transactions on,vol.: 33, Issue: 2, Mar. 1997 pp.: 2123–2126.*

Model–based learning for mobile robot navigation from the dynamical systems perspective Tani, J.; Systems, Man and Cybernetics, Part B, IEEE Transactions on, vol.: 26, Issue: 3, Jun. 1996 pp.: 421–436.*

Numerical evaluation of natural frequency change of a ferromagnetic plate due to magnetic stiffness effectTakagi, T.; Tani, J.; Ruatto, P.; Krevet, B.; Boccaccini, L.V.; Magnetics, IEEE Transactions on, vol.: 32, Issue: 3, May 1996 pp.: 1054–1057.*

Dynamic behavior analysis of a plate in magnetic field by full coupling and MMD methods Takagi, T.; Tani, J.; Magnetics, IEEE Transactions on, vol.: 30, Issue: 5, Sep. 1994 pp.: 3296–3299.*

Analysis and experiment of dynamic deflection of a thin plate with a coupling effect Takagi, T.; Matsuda, S.; Tani, J.; Kawamura, S.; Magnetics, IEEE Transactions on, vol.: 28, Issue: 2, Mar. 1992 pp.: 1259–1262.*

Task allocation and scheduling models for multiprocessor digital signal processingKonstantinides, K.; Kaneshiro, R.T.; Tani, J.R.; Acoustics, Speech, and Signal Processing [see also IEEE Transactions on Signal Processing], IEEE Transactions on, vol.: 3.*

Dynamic behavior of thin plates under impulsive magnetic field Tani, J.; Minagawa, M.; Ohtomo, K.; Saigo, M.; Magnetics, IEEE Transactions on, vol.: 26, Issue: 2, Mar. 1990 pp.: 544–547.*

On–line imitative interaction with a humanoid robot using a mirror neuron model Ito, M.; Tani, J.; Robotics and Automation, 2004. Proceedings. ICRA '04. 2004 IEEE International Conference on, vol.: 2, Apr. 26–May 1, 2004 pp.: 1071–1076 vol. 2.*

Learning goal–directed navigation as attractor dynamics for a sensory motor system. (An experiment by the mobile robot YAMABICO) Tani, J.; Fukumura, N.;Neural Networks, 1993. IJCNN '93–Nagoya. Proceedings of International Joint Conference on, vol. 2.*

Vibration control of cylindrical shells using distributed piezoelectric sensors and actuators Tani, J.; Qiu, J.; Advanced Intelligent Mechatronics '97., IEEE/ASME International Conference on, Jun. 16–20, 1997 pp.: 65.*

Trajectory planning of manipulator of a space robot using a neural network Mineta, T.; Qiu, J.; Tani, J.; Robot and Human Communication, 1997. RO–MAN '97. Proceedings., 6th IEEE International Workshop on, Sep. 29–Oct. 1, 1997 pp.: 34–39.*

An 8–GSa/s 8–bit ADC System Poulton, K.; Knudsen, K.L.; Kerley, J.; Kang, J.; Tani, J.; Cornish, E.; VanGrouw, M.; VLSI Circuits, 1997. Digest of Technical Papers., 1997 Symposium on, Jun. 12–14, 1997 pp.: 23–24.*

Evolutionary agent planning Baczewski, J.; Tani, J.; Evolutionary Computation, 1996., Proceedings of IEEE International Conference on, May 20–22, 1996 pp.:744–747.*

Parallel interface ICs for 120Mb/s fiber optic links Tani, J.; Crandall, D.; Corcoran, J.; Hornak, T.; Solid–State Circuits Conference. Digest of Technical Papers. 1987 IEEE International, vol.: XXX, Feb. 1987 pp.: 190–191.*

Intelligent cylindrical shells without vibration Jinhao Qiu; Tani, J.; Takagi, T.; Micro Machine and Human Science, 1994. Proceedings., 1994 5th International Symposium on, Oct. 2–4, 1994 pp.: 123.*

Embedding task–based behavior into internal sensory–based attractor dynamics in navigation of a mobile robot Tani, J.;ukumara, N.; Intelligent Robots and Systems '94. 'Advanced Robotic Systems and the Real World', vol.: 2, Sep. 1994 pp.: 886–893.*

The role of chaos in processing language Tani, J.; Neural Networks, 1992. IJCNN., International Joint Conference on, vol.: 3, Jun. 7–11, 1992 pp.: 444–449 vol. 3.*

Scheduling and task allocation for parallel digital signal processing architectures Konstantinides, K.; Kaneshiro, R.T.; Tani, J.R.; Acoustics, Speech, and Signal Processing, ICASSP–89., 1989 International Conference on, May 23–26, 1989 pp.: 2536–2539.*

* cited by examiner

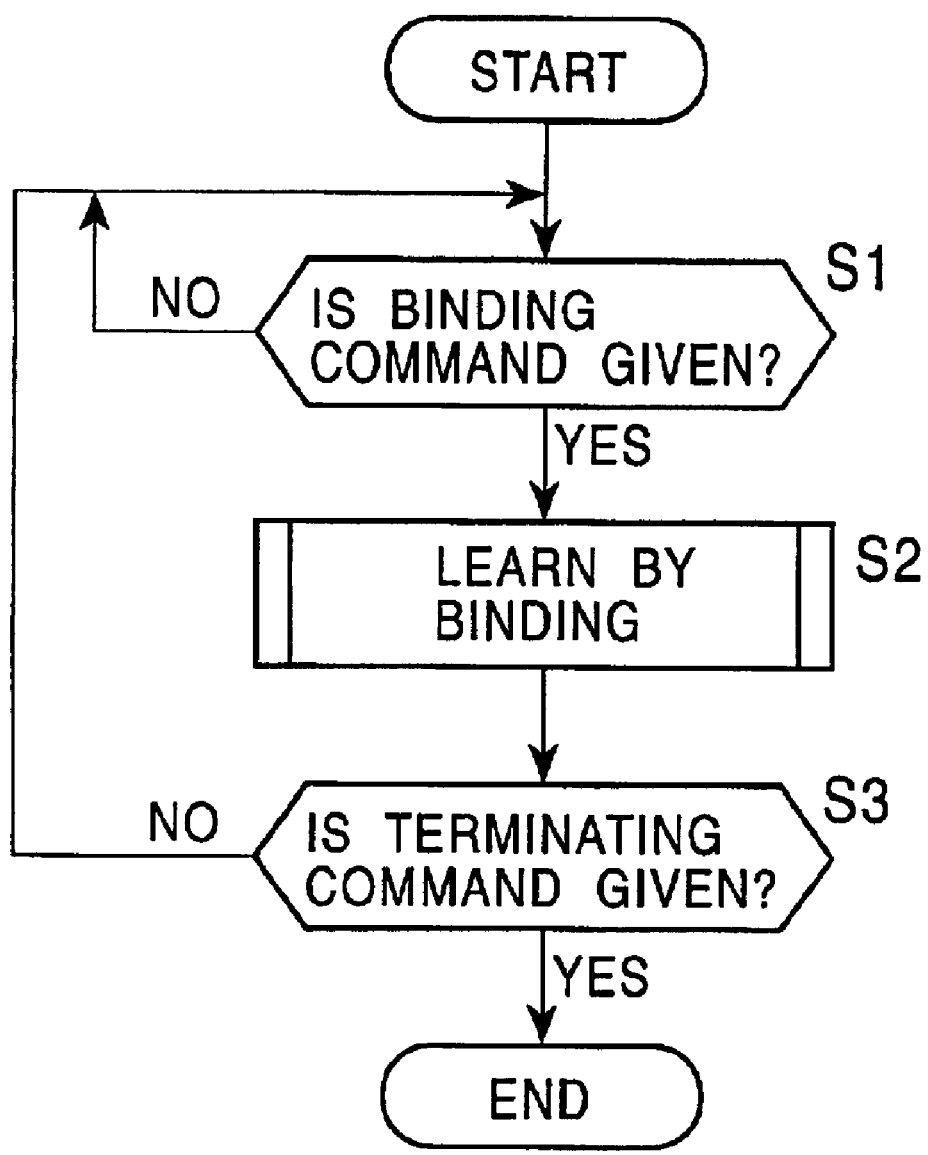

INFORMATION PROCESSING APPARATUS AND METHOD, AND RECORDING MEDIUM

BACKGROUND OF THE INVENTION

1. Field of the Invention

The present invention relates to information processing apparatuses and methods and recording media, and more specifically, relates to an information processing apparatus and method and a recording medium in which different time-series patterns which are correlated with each other can be learned.

2. Description of the Related Art

For example, various research on artificial intelligence which is applicable to robots has been conducted. In an article entitled "Reinforcement Learning With Hidden States", Long-Ji Lin proposes combining prediction and reward learning using a recurrent neural network (RNN).

In an article entitled "Learning to predict by the methods of temporal differences", Machine Learning, 3: 9–44, 1988, R. S. Sutton proposes combining an internal model and reward learning. Reinforcement learning of action policies has been conducted through rehearsals using an internal model.

However, none of the proposed techniques accomplishes learning of different time-series which are correlated with each other.

SUMMARY OF THE INVENTION

Accordingly, it is an object of the present invention to accomplish learning of different time-series which are correlated with each other.

According to an aspect of the present invention, a first information processing apparatus is provided including a first recurrent neural network and a second recurrent neural network. One of the first recurrent neural network and the second recurrent neural network learns based on a context output by the other recurrent neural network.

Preferably, one of the first recurrent neural network and the second recurrent neural network learns to output a context which corresponds to the context output by the other recurrent neural network in a predetermined state.

According to another aspect of the present invention, a first information processing method for an information processing apparatus including a first recurrent neural network and a second recurrent neural network is provided. The method includes a learning step of learning, by one of the first recurrent neural network and the second recurrent neural network, based on a context output by the other recurrent neural network.

According to a further aspect of the present invention, a first recording medium having recorded therein a computer-readable program for an information processing apparatus including a first recurrent neural network and a second recurrent neural network is provided. The program includes a learning step of learning, by one of the first recurrent neural network and the second recurrent neural network, based on a context output by the other recurrent neural network.

According to yet another aspect of the present invention, a second information processing apparatus is provided including a first recurrent neural network and a second recurrent neural network. One of the first recurrent neural network and the second recurrent neural network includes a processing unit for performing inverse dynamics processing based on a context output by the other recurrent neural network.

According to yet another aspect of the present invention, a second information processing method for an information processing apparatus including a first recurrent neural network and a second recurrent neural network is provided. The method includes a processing step of performing, by one of the first recurrent neural network and the second recurrent neural network, inverse dynamics processing based on a context output by the other recurrent neural network.

According to still another aspect of the present invention, a second recording medium having recorded therein a computer-readable program for an information processing apparatus including a first recurrent neural network and a second recurrent neural network is provided. The program includes a processing step of performing, by one of the first recurrent neural network and the second recurrent neural network, inverse dynamics processing based on a context output by the other recurrent neural network.

According to a first information processing apparatus, a first information processing method, and a program recorded in a first recording medium, one of a first recurrent neural network and a second recurrent neural network learns based on a context output by the other recurrent neural network.

According to a second information processing apparatus, a second information processing method, and a program recorded in a second recording medium, one of a first recurrent neural network and a second recurrent neural network performs inverse dynamics processing based on a context output by the other recurrent neural network.

BRIEF DESCRIPTION OF THE DRAWINGS

FIG. 4 is a flowchart showing a learning process performed by the recurrent neural networks 31-1 and 31-2 shown in FIGS. 3A and 3B;

DESCRIPTION OF THE PREFERRED EMBODIMENTS

Figure 1:
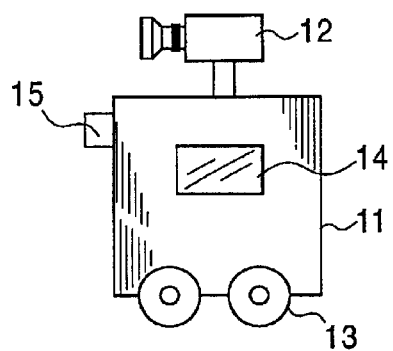
FIG. 1 shows the external structure of a robot to which the present invention is applied.

FIG. 1 shows the external structure of a robot to which an information processing apparatus of the present invention is applied. In this example, a TV camera 12 which functions as a sensor is mounted on top of a robot 11, and the TV camera 12 captures environmental images. Wheels 13 are located on the underside of the robot 11, and hence the robot 11 can move to an arbitrary position. A display 14 is attached on a lateral side of the robot 11, and the display 14 displays predetermined characters and images if necessary. A sensor 15 detects environmental information of the robot 11.

Figure 2:
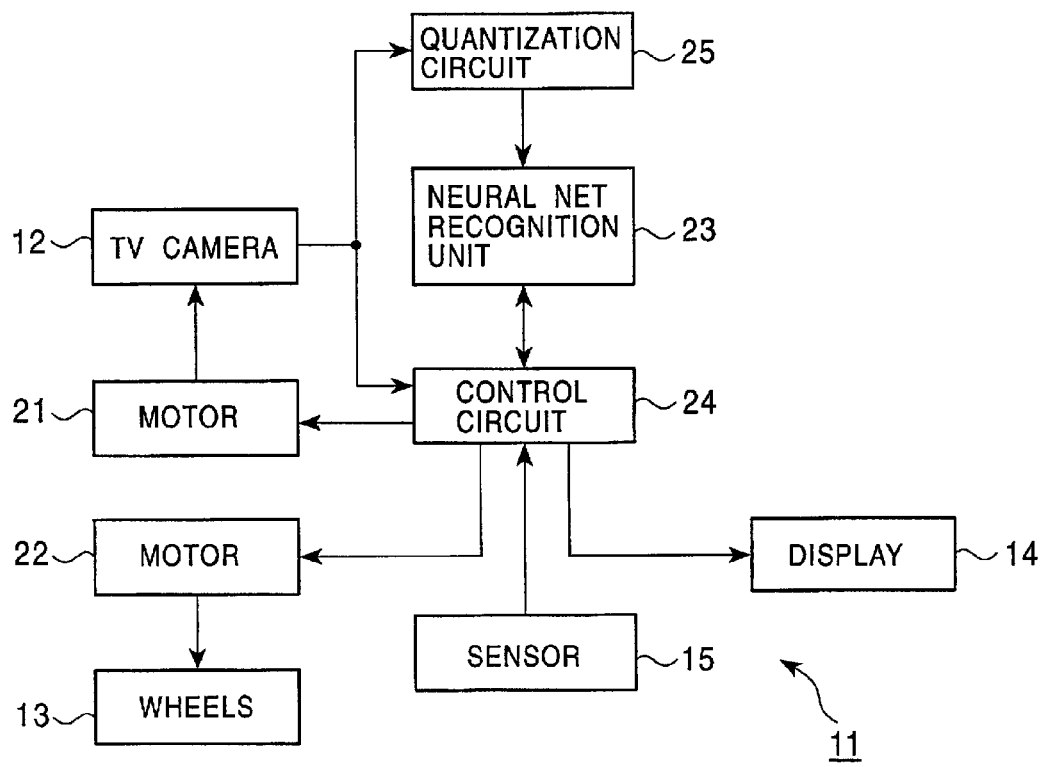
FIG. 2 is a block diagram of the internal structure of the robot shown in FIG. 1.

FIG. 2 shows the internal structure of the robot 11. The TV camera 12 captures an environmental image as a color image and outputs the captured color image data to a control circuit 24 and a quantization circuit 25. The quantization circuit 25 quantizes the input color image data and outputs the quantized data to a neural net recognition unit 23. The sensor 15 outputs various detected information to the control circuit 24. The neural net recognition unit 23 recognizes the color image data input by the quantization circuit 25 and outputs the result to the control circuit 24. For example, the control circuit 24 is formed of a microcomputer or the like. The control circuit 24 informs the neural net recognition unit 23 of the direction in which the robot 11 is moving. Also, the control circuit 24 outputs a prediction result supplied by the neural net recognition unit 23 to the display 14 which is formed of a CRT or an LCD, and the display 14 displays the prediction result.

The control circuit 24 drives a motor 21 in order to direct the TV camera 12 in a predetermined direction. The control circuit 24 also drives a motor 22 in order to rotate the wheels 13, thereby moving the robot 11 to a predetermined position.

Figure 3A:
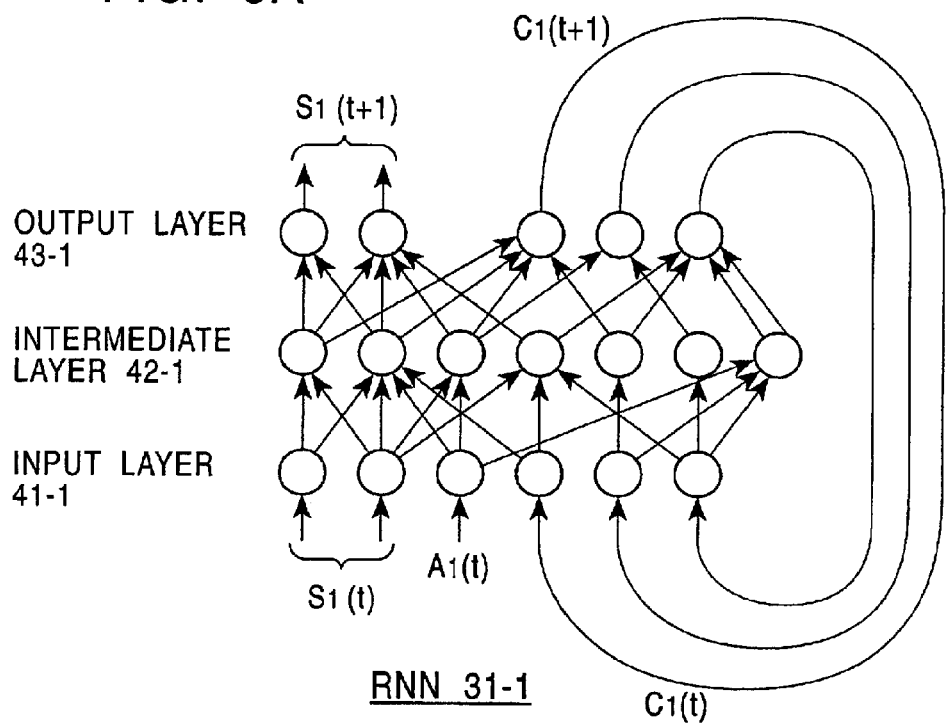
FIGS. 3A illustrates the structure of a recurrent neural network 31-1 forming a neural net recognition unit shown in FIG. 2.
Figure 3B:
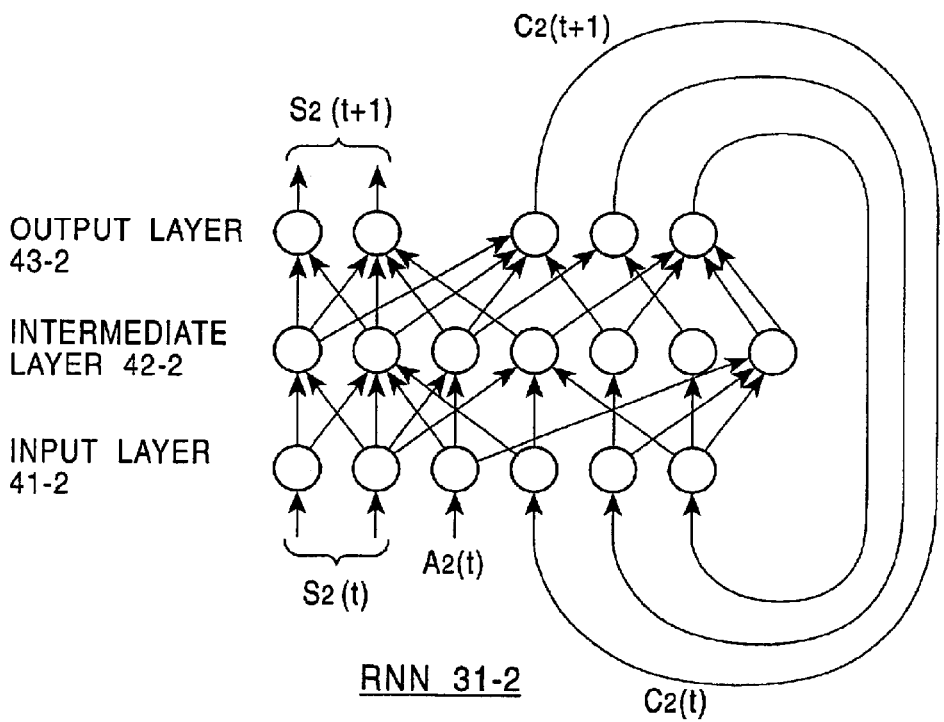
FIG. 3B illustrates the structure of another recurrent neural network 31-2 forming the neural net recognition unit shown in FIG. 2.

FIGS. 3A and 3B illustrate an example of the structure of the neural net recognition unit 23. The neural net recognition unit 23 is formed of a recurrent neural network (RNN) 31-1 shown in FIG. 3A and a recurrent neural network (RNN) 31-2 shown in FIG. 3B. The RNN 31-1 includes an input layer 41-1 which includes a predetermined number of neurons. The control circuit 24 inputs signals which correspond to states of various sensors 15 (including the TV camera 12) (hereinafter referred to as sensor) $S_1(t)$ and action $A_1(t)$ to individual neurons of the input layer 41-1. Data input to the input layer 41-1 passes through an intermediate layer 42-1 which includes a predetermined number of neurons and an output layer 43-1 which includes a predetermined number of neurons. The output layer 43-1 outputs the data as sensor $S_1(t+1)$ and action $A_1(t+1)$.

By performing predetermined learning, each neuron stores a predetermined weight coefficient. The neuron multiples an input by the weight coefficient and outputs the product to another neuron. A context $C_1(t+1)$, which is part of an output from a predetermined neuron of the output layer 43-1, is supplied as feedback to neurons of the input layer 41-1.

As in the RNN 31-1, the RNN 31-2 includes an input layer 41-2, an intermediate layer 42-2, and an output layer 43-2.

The control circuit 24 inputs $S_2(t)$ corresponding to states of various sensors 15 and action $A_2(t)$ to individual neurons of the input layer 41-2. Data input to the input layer 41-2 passes through the intermediate layer 42-2 having a predetermined number of neurons and the output layer 43-2 having a predetermined number of neurons. The output layer 43-2 outputs the data as sensor $S_2(t+1)$ and action $A_2(t+1)$.

By performing predetermined learning, each neuron stores a predetermined weight coefficient. The neuron multiples an input by the weight coefficient and outputs the product to another neuron. A context $C_2(t+1)$, which is part of an output from a predetermined neuron of the output layer 43-2, is supplied as feedback to neurons of the input layer 41-2.

The RNN 31-1 receives sensor $S_1(t)$ and action $A_1(t)$ at the current time (step) t, and the RNN 31-1 predicts and outputs sensor $S_1(t+1)$ and action $A_1(t+1)$ at the subsequent time (step) t+1. By performing behavior learning, the RNN 31-1 stores the relationship between the current time and the subsequent time by gradually changing the connection weight. Specifically, in response to the input of sensor $S_1(t)$ and action $A_1(t)$ at the current time, the RNN 31-1 learns to predict sensor $S_1(t+1)$ and action $A_1(t+1)$ which will be obtained at the subsequent time (step).

The same applies to the RNN 31-2.

FIG. 4 shows a learning process performed by the RNNs 31-1 and 31-2. In step S1, the RNNs 31-1 and 31-2 determine whether or not a user has given a binding command. If the determination is affirmative, the RNNs 31-1 and 31-2 perform the learning process by binding in step S2. In step S3, the RNNs 31-1 and 31-2 determine whether or not the user has given a terminating command. If the determination is negative, the RNNs 31-1 and 31-2 return to step S1, and the processing from step S1 onward is repeated. If the determination in step S3 is affirmative, the process is terminated.

Figure 5:
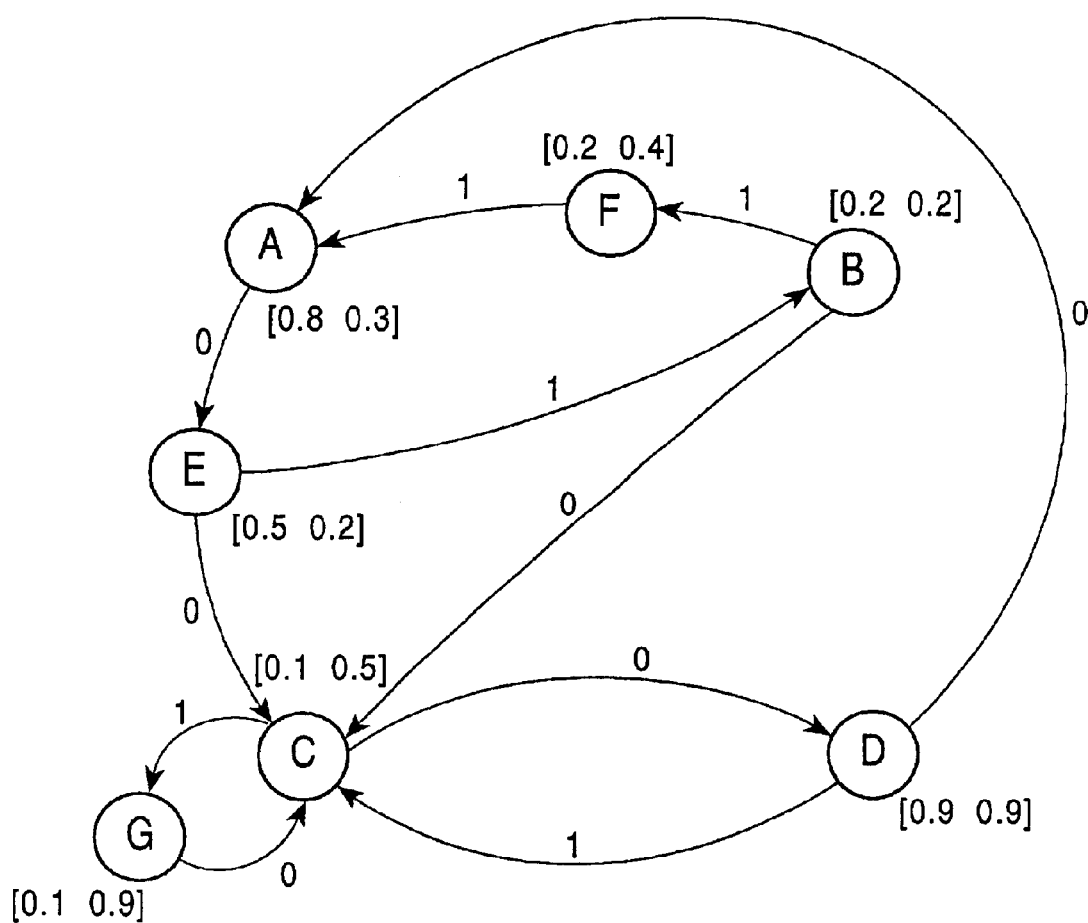
FIG. 5 is a state transition diagram of the recurrent neural network 31-1 shown in FIG. 3A.
Figure 6:
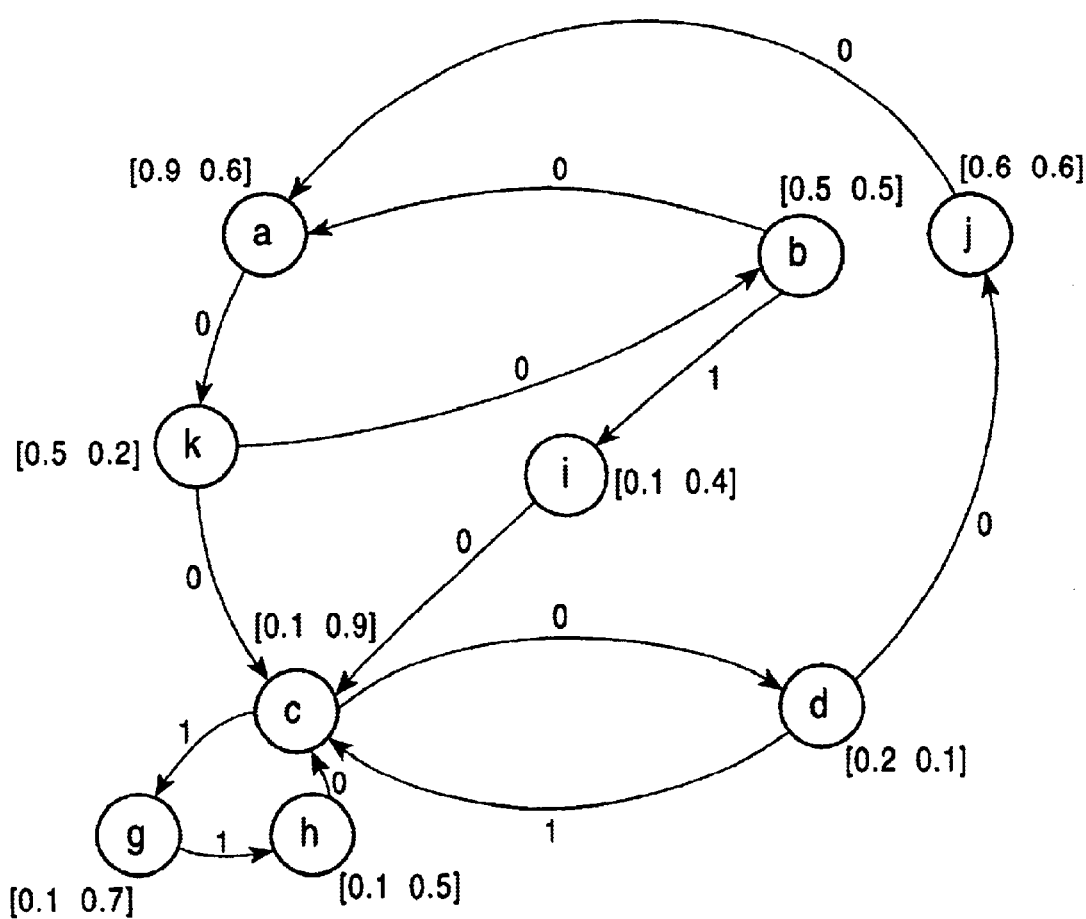
FIG. 6 is a state transition diagram of the recurrent neural network 31-2 shown in FIG. 3B.

More specifically, when the robot 11 moves along a predetermined path, the RNN 31-1 goes through a state transition shown in FIG. 5, and the RNN 31-2 goes through a state transition shown in FIG. 6. In FIGS. 5 and 6, numerals enclosed in parentheses [ ] are two values of sensor $S_1(t+1)$ output by the output layer 43-1 or two values of sensor $S_2(t+1)$ output by the output layer 43-2, respectively. A numeral which corresponds to an arrow indicating a transition from a predetermined state to another state represents action $A_1(t)$ or $A_2(t)$ which is input to the input layer 41-1 or 41-2, respectively.

As shown in FIG. 5, in the RNN 31-1, for example, the output values of sensor $S_1$ at state F are [0.2 0.4]. When "1" is input as action $A_1$ at state F, the state changes from state F to state A, and the output values of sensor $S_1$ become [0.8 0.3].

When "0" is input as action $A_1$ at state A, the state changes to state E, and the output values of sensor $S_1$ become [0.5 0.2].

When "0" is input as action $A_1$ at state E, the state changes to state C, and the output values of sensor $S_1$ become [0.1 0.5]. When "1" is input as action $A_1$ at state E, the state changes from state E to state B, and the output values of sensor $S_1$ become [0.2 0.2].

When "1" is input as action $A_1$ at state B, the state changes to state F, and the sensor $S_1$ outputs [0.2 0.4].

Alternatively, when "0" is input as action $A_1$ at state B, the state changes to state C, and the sensor $S_1$ outputs [0.1 0.5].

When "1" is input as action $A_1$ at state C, the state changes to state G, and the sensor $S_1$ outputs [0.1 0.9]. When "0" is input as action $A_1$ at state G, the state changes to state C.

Alternatively, when "0" is input as action $A_1$ at state C, the state changes to state D, and the sensor $S_1$ outputs [0.9 0.9].

When "1" is input as action $A_1$ at state D, the state changes to state C. Alternatively, when "0" is input as action $A_1$ at state D, the state changes to state A.

Referring to FIG. 6, in the RNN 31-2, the outputs of sensor $S_2$ at state a are [0.9 0.6]. When "0" is input as action $A_2$ at state a, the state changes to state k, and the sensor $S_2$ outputs [0.5 0.2].

When "1" is input as action $A_2$ at state k, the state changes to state c, and the sensor $S_2$ outputs [0.1 0.9].

When "1" is input as action $A_2$ at state c, the state changes to state g, and the sensor $S_2$ outputs [0.1 0.7]. When "1" is input as action $A_2$ at state g, the state changes to state h, and the sensor $S_2$ outputs [0.1 0.5].

When "0" is input as action $A_2$ at state h, the state changes to state c.

When "0" is input as action $A_2$ at state k, the state changes to state b, and the sensor $S_2$ outputs [0.5 0.5]. When "0" is input as action $A_2$ at state b, the state changes to state a. Alternatively, when "1" is input as action $A_2$ at state b, the state changes to state i, and the sensor $S_2$ outputs [0.1 0.4].

When "0" is input as action $A_2$ at state i, the state changes to state c.

When "0" is input as action $A_2$ at state c, the state changes to state d, and the sensor $S_2$ outputs [0.2 0.1].

When "1" is input as action $A_2$ at state d, the state changes to state c. Alternatively, when "0" is input as action $A_2$ at state d, the state changes to state j, and the sensor $S_2$ outputs [0.6 0.6]. When "0" is input as action $A_2$ at state j, the state changes to state a.

In FIGS. 5 and 6, although there is discrimination between lowercase and uppercase characters, states indicated by the same letter correspond to each other. For example, state A and state a, state B and state b, state C and state c, state D and state d, and state G and state g correspond to each other, respectively. States E and F in FIG. 5 do not correspond to any states in FIG. 6, nor do states h to k in FIG. 6 correspond to any states in FIG. 5.

A state is said to be in correspondence with another state when the RNN 31-1 and the RNN 31-2 are highly correlated.

Figure 7:
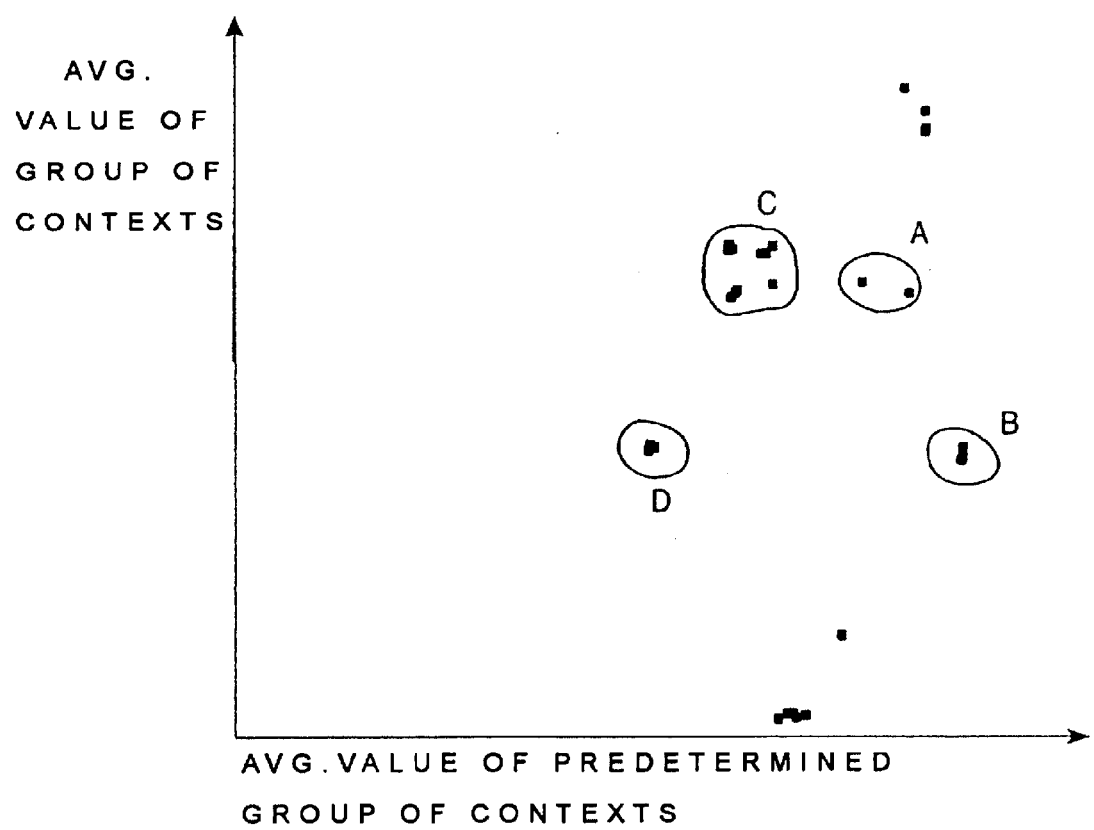
FIG. 7 is a phase-plot graph corresponding to the state transition diagram shown in FIG. 5.

FIG. 7 is a graph showing a phase plot of context values at various states of the RNN 31-1 shown in FIG. 5. Referring to FIG. 7, the average value of a predetermined group of contexts output by the RNN 31-1 is shown on the abscissa, and the average value of another group is shown on the ordinate. Specifically, the graph in FIG. 7 can be obtained by projecting phases (states) formed of context elements on a two-dimensional plane defined by the average values of two groups of contexts. On the projected plane, states A to D in FIG. 7 are indicated by corresponding symbols.

Figure 8:
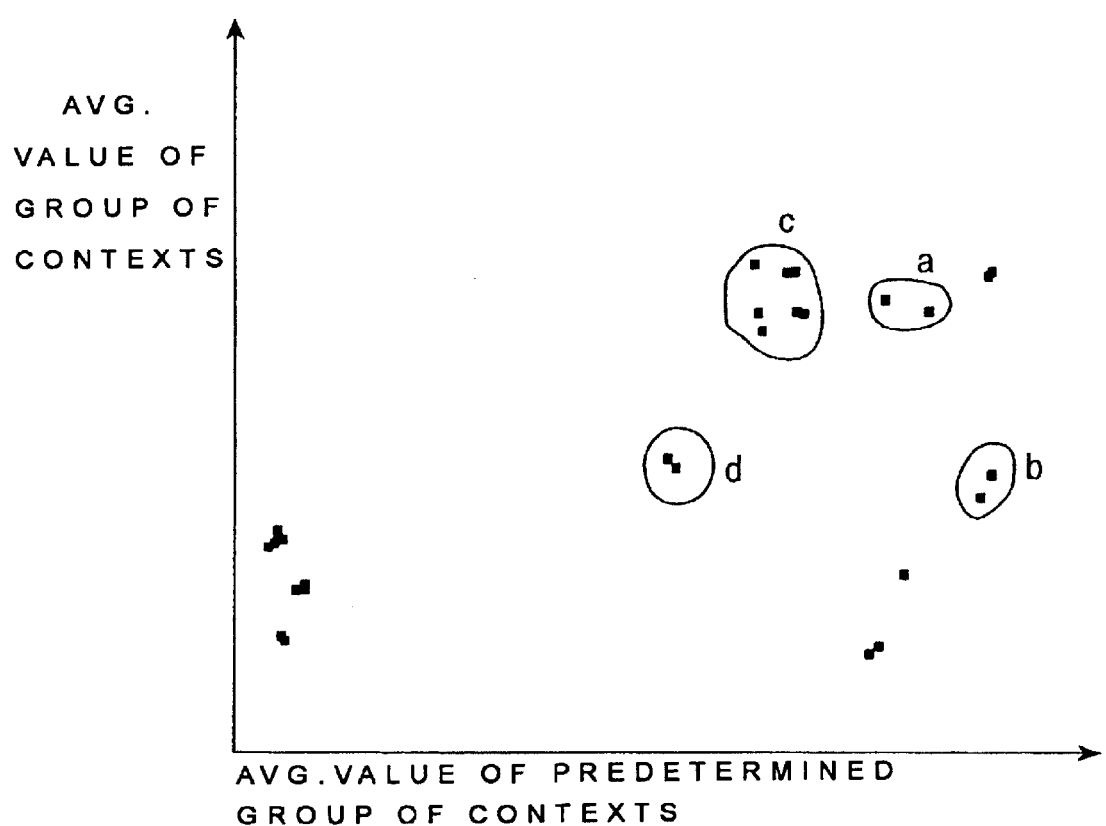
FIG. 8 is a phase-plot graph corresponding to the state transition diagram shown in FIG. 6.

Similarly, FIG. 8 is a phase plot of various states of the RNN 31-2 shown in FIG. 6. Referring to FIG. 8, states a to d in FIG. 6 are indicated by corresponding symbols.

By comparing FIGS. 7 and 8, it can be concluded that states A to D in FIG. 7 are represented at positions (on coordinates) which substantially correspond to states a to d in FIG. 8. Accordingly, it means that states A to D are highly correlated with states a to d, respectively.

The user gives a command to execute the learning process by binding in step S2 in FIG. 4 when states from among those in FIGS. 5 and 6 correspond to each other (when states are highly correlated with each other). Thus, when it is determined in step S1 that the RNN 31-1 is at one of states A to D and G and the RNN 31-2 is at one of states a to d and g, the learning process by binding is performed. If the RNN 31-1 is at one of the other states E and F and the RNN 31-2 is at one of the other states h to k, no command is input. In this case, the learning process by binding is not performed.

Figure 9:
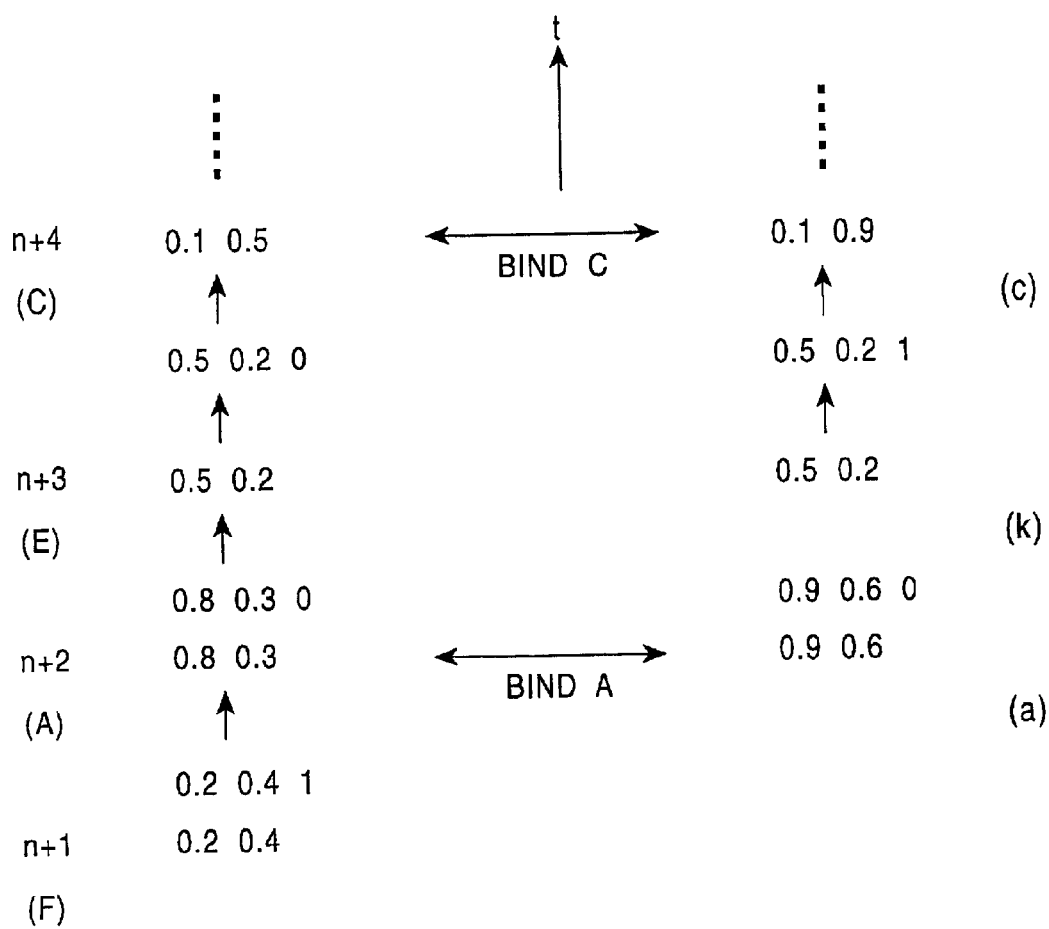
FIG. 9 illustrates time-series variations in sensors and actions involved in the state transitions shown in FIGS. 5 and 6.

FIG. 9 illustrates time-series of sensors and actions of the RNN 31-1 and RNN 31-2, which correspond to step-by-step movement of the robot 11. Concerning the RNN 31-1, step n+1 corresponds to state F in FIG. 5, and step n+2 corresponds to state A, step n+3 corresponds to state E, and step n+4 corresponds to state C. In contrast, concerning the RNN 31-2, step n+2 corresponds to state a, step n+3 corresponds to state k, and step n+4 corresponds to state c.

In the time-series in which the state undergoes transition, the learning process by binding is performed in corresponding state steps (step n+2 and step n+4 in FIG. 9).

Figure 10:
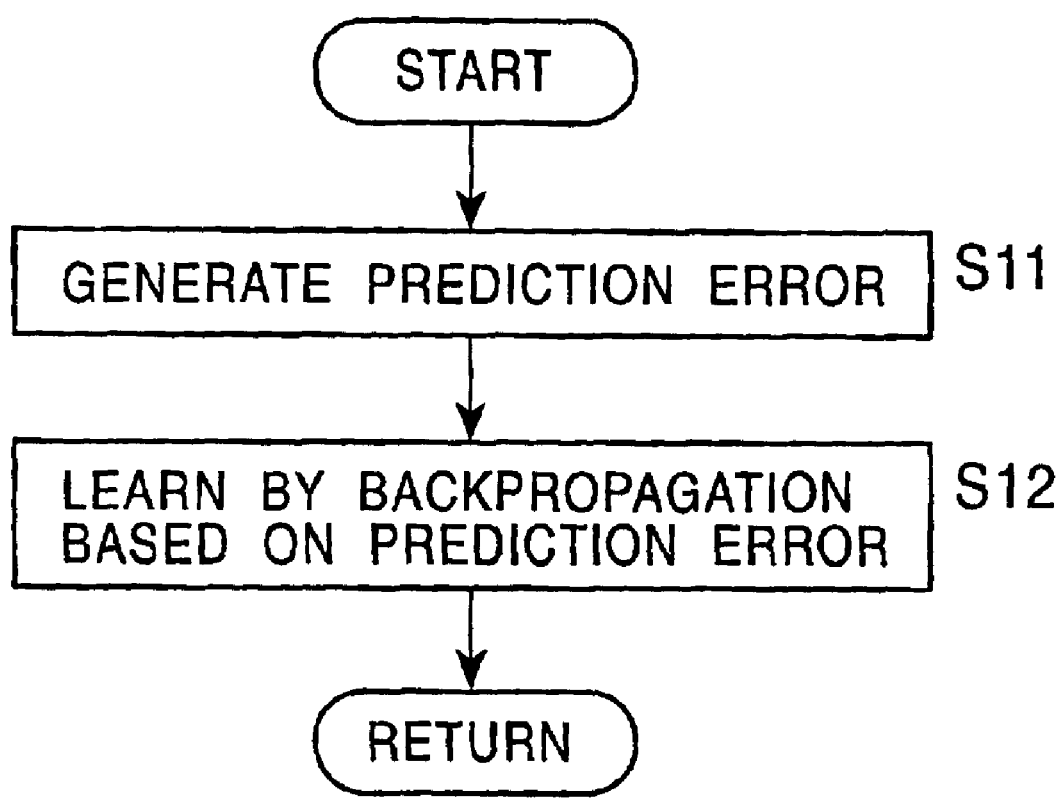
FIG. 10 is a flowchart showing details of the learning process using binding in step S2 in FIG. 4.

The learning process by binding is performed in a manner illustrated by a flowchart in FIG. 10. The learning process is performed by the RNN 31-1 and the RNN 31-2, respectively.

Figure 11:
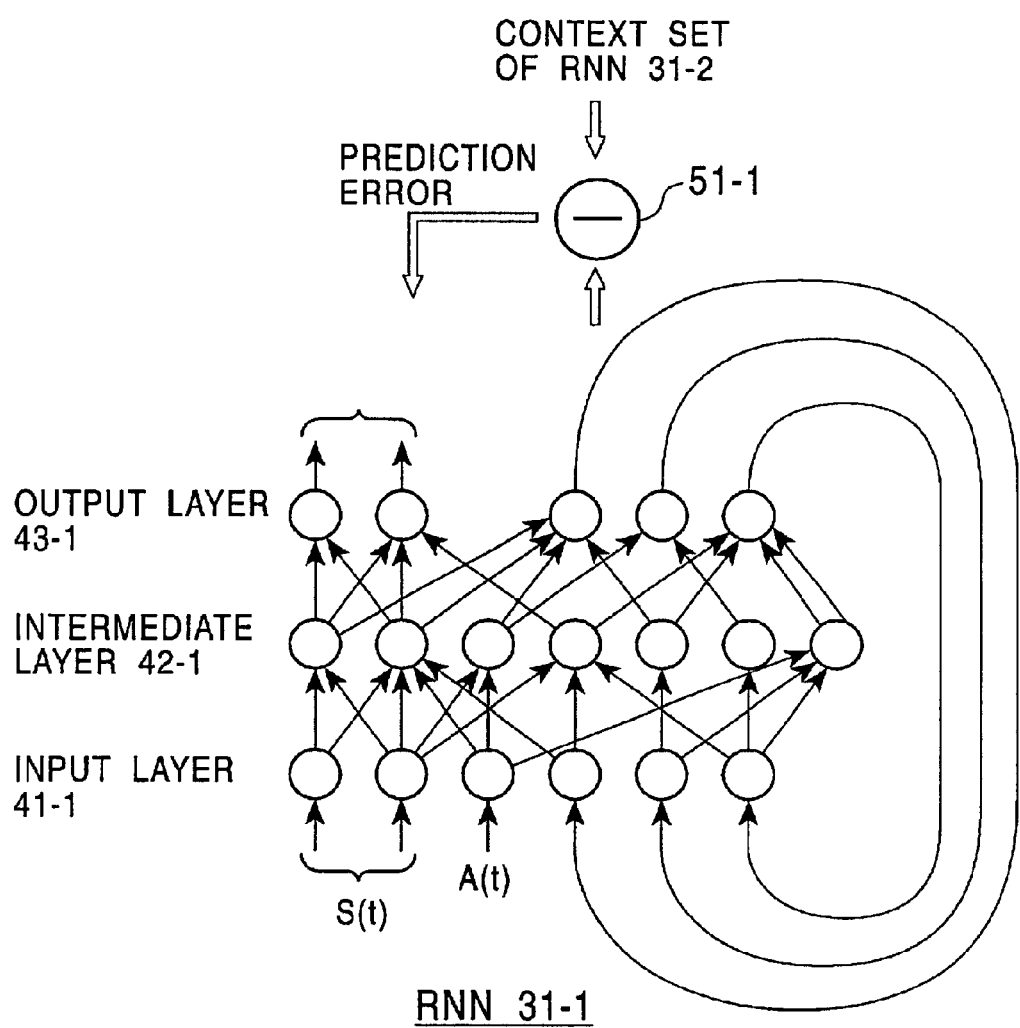
FIG. 11 illustrates a binding learning process performed by the recurrent neural network 31-1 shown in FIG. 3A.

In step S11, a prediction error is generated. In the RNN 31-1, as shown in FIG. 11, a context set output by the RNN 31-2 is input to a subtractor 51-1. The difference between the context set of the RNN 31-2 and a context set output by the 31-1 is computed as a prediction error. In step S12, backpropagation is performed based on the prediction error obtained in step S11, thereby determining a coefficient for each neuron of the output layer 43-1, the intermediate layer 42-1, and the input layer 41-1 in order to minimize the prediction error.

Figure 12:
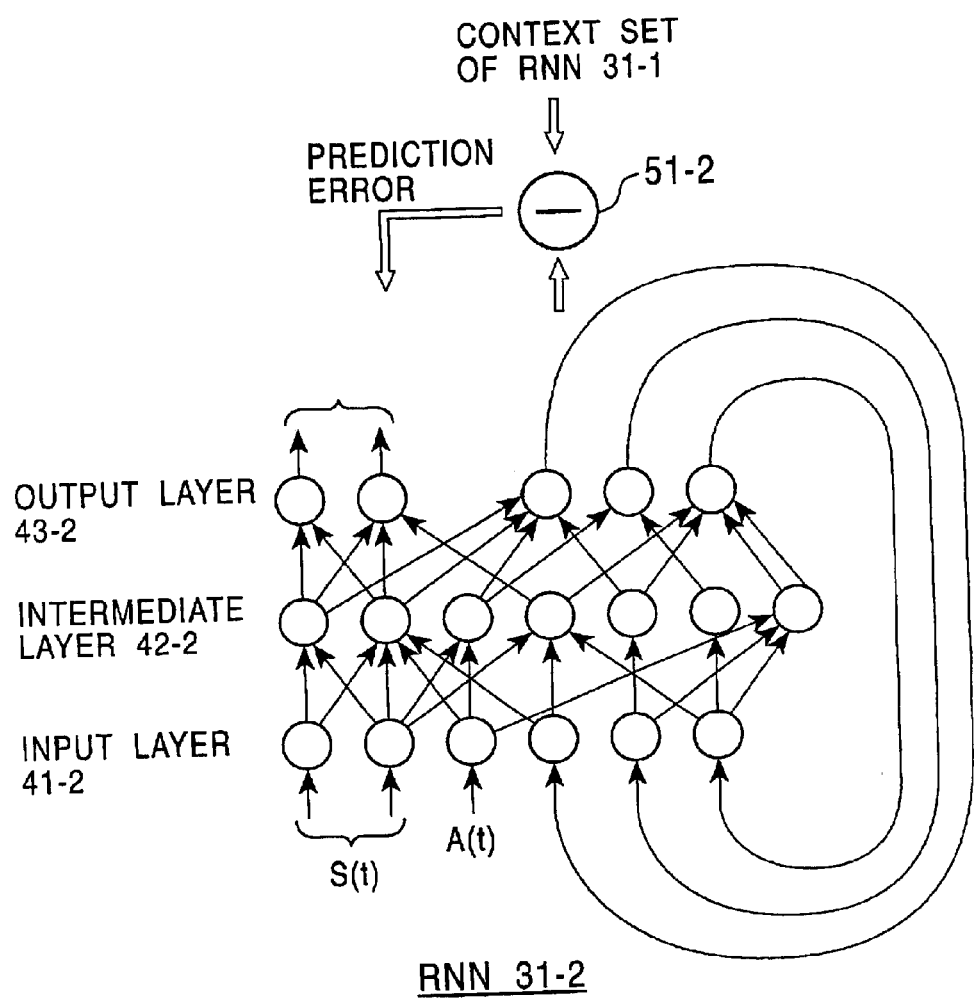
FIG. 12 illustrates a binding learning process performed by the recurrent neural network 31-2 shown in FIG. 3B.

Similarly, in the RNN 31-2, as shown in FIG. 12, a context set of the RNN 31-1 is input to a subtractor 51-2. The difference between the context set of the RNN 31-1 and a context set output by the RNN 31-2 is computed as a prediction error. Backpropagation is performed based on the prediction error to determine a coefficient for each neuron of the output layer 43-2, the intermediate layer 42-2, and the input layer 41-2 in order to minimize the prediction error.

Figure 13:
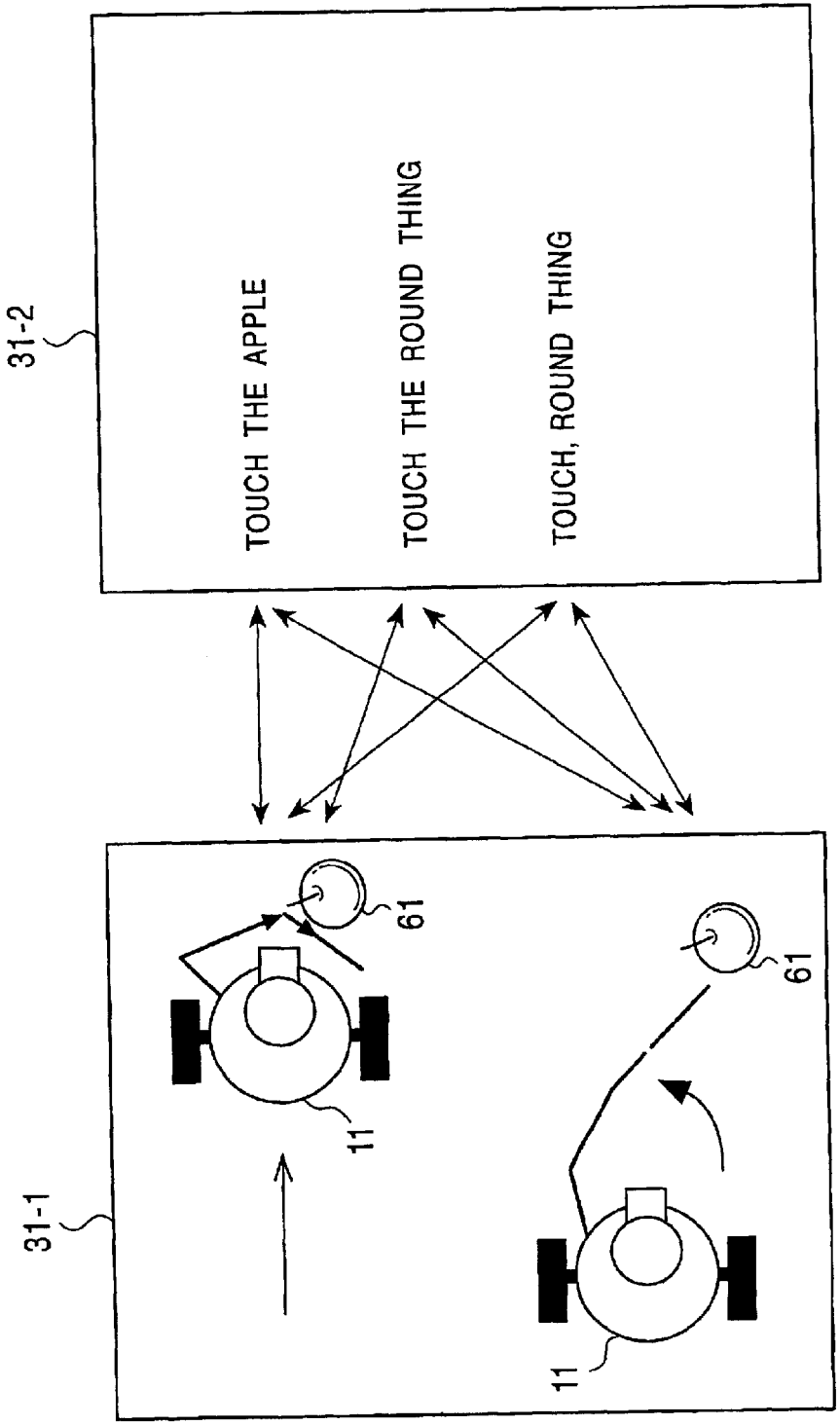
FIG. 13 illustrates an example of processing performed by the recurrent neural networks 31-1 and 31-2.

For example, the RNN 31-1 performs processing with regard to actions of the robot 11, and the RNN 31-1 performs speech recognition processing. Referring to FIG. 13, the robot 11 is made to detect an apple 61, to move to the apple 61, and to touch the apple 61. In accordance with these actions, the RNN 31-2 processes speech messages such as "touch the apple", "touch the round thing", and "touch, round thing". Thus, the correlation between the actions by the RNN 31-1 and the speech recognition by the RNN 31-2 is learned.

Figure 14:
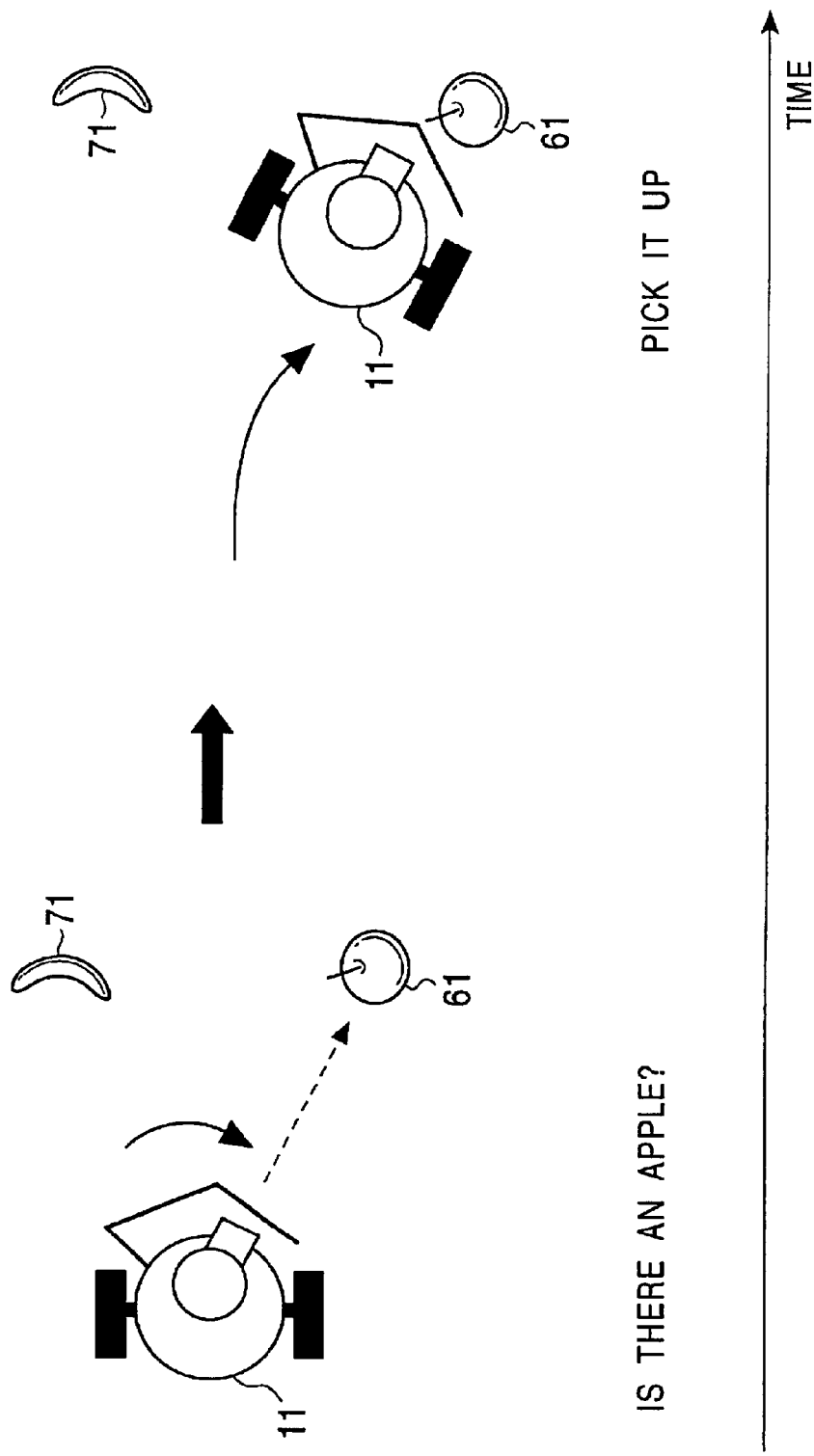
FIG. 14 illustrates actions taken by the robot.

Referring to FIG. 14, the apple 61 and a banana 71 are placed in a field in which the robot 11 is set. By inputting a message such as "Is there an apple?" to the robot 11, the robot 11 is made to detect the apple 61. Also, by inputting a message such as "Pick it up" to the robot 11, the robot 11 is made to move to a position in front of the apple 61 and to pick up the apple 61.

Figure 15:
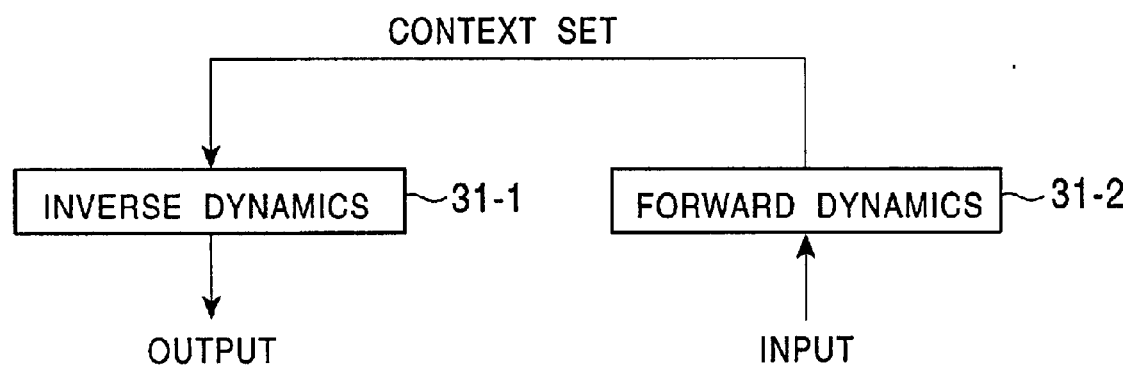
FIG. 15 illustrates the operation of the recurrent neural networks 31-1 and 31-2 shown in FIGS. 3A and 3B in response to a context set.

Referring to FIG. 15, for example, predetermined speech is input to the RNN 31-2. In response to this, the RNN 31-2 performs forward dynamics processing and obtains a context set. The context set is supplied to the RNN 31-1, and the RNN 31-1 in turn performs inverse dynamics processing. As a result, a predetermined action can be output.

Figure 16:
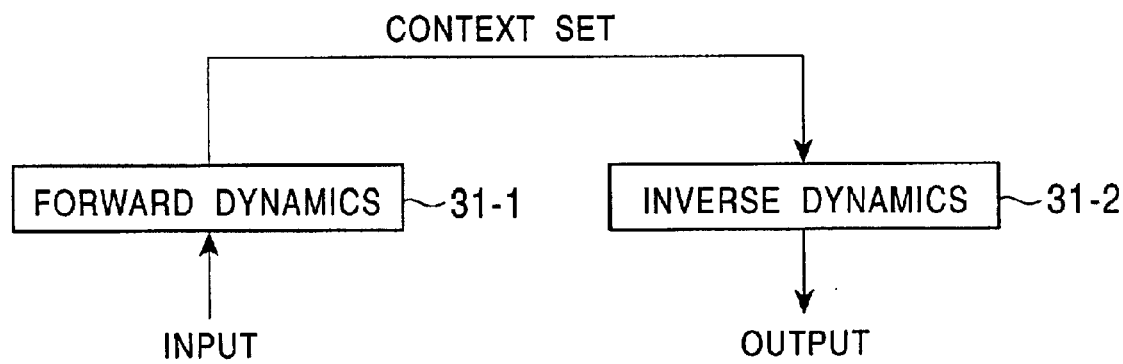
FIG. 16 illustrates the operation of the recurrent neural networks 31-1 and 31-2 shown in FIGS. 3A and 3B in response to a context set.

In contrast, as shown in FIG. 16, a predetermined action is input to the RNN 31-1. In response to this, the RNN 31-1 performs forward dynamics processing and obtains a context set. The context set is supplied to the RNN 31-2, and the RNN 31-2 in turn performs inverse dynamics processing. As a result, predetermined speech can be output.

If necessary, the forward dynamics processing and the inverse dynamics processing performed by the RNN 31-1 and the RNN 31-2 are repeated a predetermined number of times by inputting an output as feedback.

Although a case in which the present invention is applied to a robot has been described, the present invention is also applicable to other information processing apparatuses.

Concerning a recording medium which provides users with a computer program for performing the foregoing processing, a magnetic disk, a CD-ROM, or a solid-state memory can be used. It is also possible to transfer a program in such a recording medium through a network or a satellite and to store the program in the recording medium.

What is claimed is:

1. An information processing apparatus comprising:
   a first recurrent neural network;
   a second recurrent neural network;
   prediction error generating means for generating a prediction error based on a difference between an output of said first recurrent neural network and said second recurrent neural network; and
   coefficient determining means for determining a coefficient by performing a backpropagation based on said prediction error in order to minimize said prediction error,
   wherein one of said first recurrent neural network and said second recurrent neural network learns based on a context output by the other recurrent neural network.

2. An information processing apparatus according to claim 1, wherein one of said first recurrent neural network and said second recurrent neural network learns to output a context which corresponds to the context output by the other recurrent neural network in a predetermined state.

3. An information processing method for an information processing apparatus including a first recurrent neural network and a second recurrent neural network, the method comprising:
   a generating step for generating a prediction error based on a difference between an output of said first recurrent neural network and said second recurrent neural network;
   a determining step for determining a coefficient by performing a backpropagation based on said prediction error in order to minimize said prediction error; and
   a learning step of learning, by one of said first recurrent neural network and said second recurrent neural network, based on a context output by the other recurrent neural network.

4. A recording medium having recorded therein a computer-readable program for an information processing apparatus including a first recurrent neural network and a second recurrent neural network, the program comprising:
   a generating step for generating a prediction error based on a difference between an output of said first recurrent neural network and said second recurrent neural network;
   a determining step for determining a coefficient by performing a backpropagation based on said prediction error in order to minimize said prediction error; and
   a learning step of learning, by one of said first recurrent neural network and said second recurrent neural network, based on a context output by the other recurrent neural network.

5. An information processing apparatus comprising:
   a first recurrent neural network;
   a second recurrent neural network;
   prediction error generating means for generating a prediction error based on a difference between an output of said first recurrent neural network and said second recurrent neural network; and
   coefficient determining means for determining a coefficient by performing a backpropagation based on said prediction error in order to minimize said prediction error,
   wherein one of said first recurrent neural network and said second recurrent neural network comprises processing means for performing inverse dynamics processing based on a context output by the other recurrent neural network.

6. An information processing method for an information processing apparatus including a first recurrent neural network and a second recurrent neural network, the method comprising:
   a generating step for generating a prediction error based on a difference between an output of said first recurrent neural network and said second recurrent neural network;
   a determining step for determining a coefficient by performing a backpropagation based on said prediction error in order to minimize said prediction error; and
   a processing step of performing, by one of said first recurrent neural network and said second recurrent neural network, inverse dynamics processing based on a context output by the other recurrent neural network.

7. A recording medium having recorded therein a computer-readable program for an information processing apparatus including a first recurrent neural network and a second recurrent neural network, the program comprising:
   a generating step for generating a prediction error based on a difference between an output of said first recurrent neural network and said second recurrent neural network;
   a determining step for determining a coefficient by performing a backpropagation based on said prediction error in order to minimize said prediction error; and
   a processing step of performing, by one of said first recurrent neural network and said second recurrent neural network, inverse dynamics processing based on a context output by the other recurrent neural network.

* * * * *